Nov. 23, 1937.   W. F. HEROLD ET AL   2,099,958
MOUNT FOR INDICATORS
Filed March 6, 1936
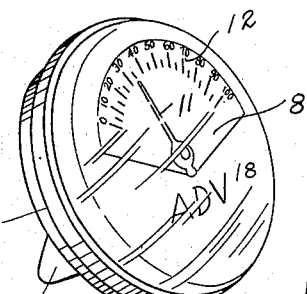
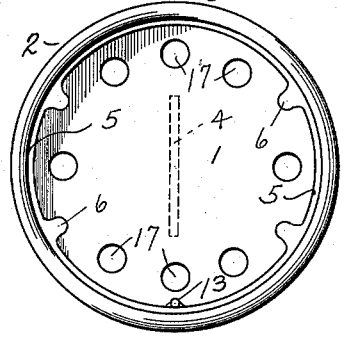
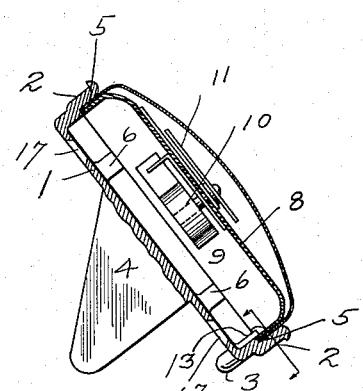
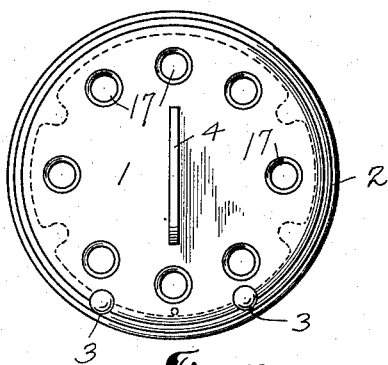
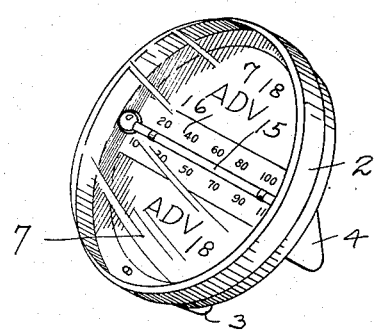
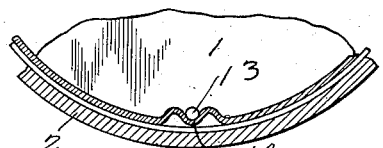

Patented Nov. 23, 1937

2,099,958

UNITED STATES PATENT OFFICE 2,099,958

MOUNT FOR INDICATORS

Walter F. Herold and Leo Deutsch, Springfield, Ohio, assignors to The Chaney Manufacturing Company, Springfield, Ohio, a corporation of Ohio Application March 6, 1936, Serial No. 67,512

2 Claims. (Cl. 73—151)

This invention relates to an indicator support or housing for a thermometer, aneroid barometer, humidity indicators or analogous instruments of either the portable or the desk style or a hanger or wall type device.

The mount forming the subject matter hereof comprises a saucer shaped housing having a transparent cover dome and provided interiorly with a seat upon which an instrument panel may rest in spaced relation with the back of the support which is perforated for air circulation. If of the desk or portable type it is provided with integral feet and a rest by which the device is rendered self supporting.

The purpose of the invention is to provide a mounting of relatively small size but of attractive appearance which may be economically manufactured at such low cost as to permit distribution for advertising purposes, but which may also be produced in more elaborate design for commercial exploitation.

A further object of the invention is to provide a housing or mount which is applicable to instruments of different character and which will not only be of simple construction but which may be economically manufactured and consisting of but few parts which may be easily assembled.

A further object of the invention is to provide a housing which while affording maximum protection to the enclosed instrument will permit free circulation of air thereabout in order to afford accurate operation of the instrument in response to atmospheric variations of temperature, pressure or humidity, according to the type of indicator enclosed.

A further object of the invention is to provide a housing wherein the instrument is supported in spaced relation with the housing wall and to provide suitable spacing means therein.

A further object of the invention is to provide a mount or housing for a thermometer or analogous instrument having ample space therein for display of advertising matter or other indicia.

A further object of the invention is to provide a protective housing having a transparent dome enclosing the instrument.

With the above primary and other incidental objects in view, as will more fully appear in the specification, the invention consists of the features of construction, the parts and combinations thereof, and the mode of operation or their equivalents, as hereinafter described and set forth in the claims.

In the drawing wherein is shown the preferred, but obviously not necessarily the only form of embodiment of the invention, Fig. 1 is a perspective view of an assembled indicator embodying the present invention.

Fig. 2 is a perspective view thereof enclosing a thermometer tube.

Fig. 3 is a vertical sectional view thereof.

Fig. 4 is a front elevation of the empty housing member.

Fig. 5 is a rear elevation thereof.

Fig. 6 is a detail view.

Like parts are indicated by similar characters of reference throughout the several views.

The present mounting is especially adapted for displaying a thermometer, barometer, or humidity indicator in association with advertising matter or other indicia. Being primarily intended for such advertising purposes it is highly important that the device be of construction which may be economically manufactured. However in lieu of inexpensive construction for advertising distribution, the device may be constructed of larger size and of more elaborate ornamental design than that shown, and the areas otherwise utilized for advertising display may receive indicia of more personal nature such as monograms, emblems, personal names or appropriate inscriptions other than advertisements. Likewise while as shown in the drawing the mounting is supported easel fashion in an upwardly inclined position, it may comprise a wall device to be suspended from a support.

As illustrated in the drawing, the mounting comprises a circular saucer or pan shaped receptacle having a perforate bottom 1 and upstanding marginal walls or rim 2.

Obviously this housing member may be of polygonal form. For economy of production it is preferably molded from phenolic condensation or other plastic molding material, but may be stamped or otherwise formed from sheet metal. The rear face of the housing member is provided with spaced lugs or feet 3 substantially coincident with the periphery thereof upon which the structure may be supported in an inclined position by a rearwardly extending wing 4 disposed in a vertical plane intermediate the supporting feet or lugs 3. The wing 4 is preferably formed integral with the housing, but may be separately formed and attached thereto.

A circumferential rabbet or shoulder 5 is disposed interiorly of the housing in a plane intermediately the front and rear planes thereof to form a seat for an instrument panel. Contiguous to the rabbet or shoulder 5 spaced piers or supports 6 are provided within the housing which further assist in supporting the indicator panel. The panel may be flat as shown at 7 in Fig. 2 if intended for a thermometer support. However for an aneroid barometer or humidity indicator the panel is preferably of a reverse saucer or concave form as shown at 8. The rim of such concave indicator panel 8 is telescoped within the rim of the housing where it rests upon the rabbet 5. It forms intermediate the panel and perforate back wall of the housing a spacious chamber 9 in which may be located suitable mechanism 10 for actuating an indicator hand 11. The indicator hand cooperates with a graduated dial 12 upon the panel 8 to indicate varying atmospheric conditions.

To insure assembly of the panel and housing in proper position of rotative adjustment, to present the dial in upright relation, the housing is interiorly provided with a small rib 13 which projects slightly beyond the rabbet 5 in the form of a stud, and the rim of the panel is provided with a corresponding crimp 14 within which the stud 13 is engageable.

In the event that the mounting is utilized as a thermometer support, a flat disc 7 is used as a panel upon which a thermometer tube 15 is secured in adjusted relation with a thermometer scale 16 imprinted in the panel disc 7. This panel disc is of such size as to fit within the peripheral wall 2 of the housing and rest upon the rabbet 5. The spaced piers 6 which extend inwardly in flush relation with the rabbet assist in supporting and stiffening the thermometer panel disc.

Superposed upon the instrument panel whether it be the concavo-convex panel 8 or the flat disc 7 is a transparent concavo-convex dome 16' of somewhat greater depth than the panel 8 to afford therebetween ample space for operation of the indicator hand 11. The transparent dome 16' also rests upon the rabbet 5 exteriorly of the panel and these parts are cemented in such position.

The chamber 9 has free communication with atmosphere through the holes 17 in the rear wall 1 of the housing so that the control means 10 is directly subjected to varying atmospheric conditions. The flat thermometer back disc 7 is likewise provided with a hole coincident with the bulb of the thermometer tube through which the bulb is subjected to temperature changes occurring in the chamber 9 which as stated communicates with atmosphere through the openings 17.

The indicator panels in addition to the graduated dial or scale appearing thereon afford areas 18 of quite considerable extent for display of advertising matter or emblems, inscriptions or other indicia of personal nature.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A mount for an indicator of the character described, comprising a saucer like housing having a perforated back wall, a spacer ledge intermediate the front and rear planes of such saucer shaped housing to receive an instrument panel, a concavo-convex indicator panel engaging thereon and forming intermediate such panel and the perforated rear wall of the housing an air chamber communicating with atmosphere through the perforations in the rear wall, an indicator means associated therewith, and a transparent concavo-convex dome of greater depth than the concavo-convex indicator panel telescopically engaged with the housing and enclosing the indicator panel and associated indicator means.

2. A mount for an indicator of the character described, comprising a saucer-like housing having a perforated back wall, a spacer ledge intermediate the front and rear planes of such saucer-shaped housing to receive an instrument panel, an indicator panel engaging thereon and forming intermediate such panel and the perforated rear wall of the housing an air chamber communicating with atmosphere through the perforations in the rear wall an indicator means associated therewith, and a transparent concavo-convex dome telescopically engaged with the housing and panel for covering the indicator panel and associated indicator means.

WALTER F. HEROLD.
LEO DEUTSCH.